United States Patent
Fenn et al.

(10) Patent No.: US 9,591,466 B2
(45) Date of Patent: Mar. 7, 2017

(54) METHOD AND APPARATUS FOR ACTIVATING AN EMERGENCY BEACON SIGNAL

(75) Inventors: John Barry Fenn, Mandelieu-la-Napoule (FR); Nicholas Patrick Alfano, Stratford-Upon-Avon (GB); Gordon Peter Young, Shipston-on-Stour (GB)

(73) Assignee: BlackBerry Limited, Waterloo, Ontario (CA)

( * ) Notice: Subject to any disclaimer, the term of this patent is extended or adjusted under 35 U.S.C. 154(b) by 249 days.

(21) Appl. No.: 13/543,270

(22) Filed: Jul. 6, 2012

(65) Prior Publication Data

US 2014/0011469 A1 Jan. 9, 2014

(51) Int. Cl.
*H04W 4/22* (2009.01)
*H04W 4/06* (2009.01)
*H04W 4/14* (2009.01)

(52) U.S. Cl.
CPC .............. *H04W 4/22* (2013.01); *H04W 4/06* (2013.01); *H04W 4/14* (2013.01)

(58) Field of Classification Search
CPC ..... H04W 4/22; H04W 76/007; H04W 88/02; H04W 4/14; H04W 4/06; H04M 1/72536
USPC .................. 340/539.13, 471, 686.6, 6.1, 8.1; 370/236, 312; 455/404.1, 404.2, 456.1, 455/456.6, 90.1, 500
See application file for complete search history.

(56) References Cited

U.S. PATENT DOCUMENTS

| | | | |
|---|---|---|---|
| 6,038,438 A * | 3/2000 | Beeson et al. ............. | 455/404.2 |
| 6,314,281 B1 * | 11/2001 | Chao et al. ................ | 455/404.2 |
| 7,042,338 B1 * | 5/2006 | Weber ........................ | 340/309.5 |
| 2003/0034881 A1 * | 2/2003 | Linnett et al. ........... | 340/309.15 |
| 2004/0053621 A1 * | 3/2004 | Sugaya ............... | H04W 72/082 455/450 |
| 2004/0199056 A1 * | 10/2004 | Husemann et al. .......... | 600/300 |
| 2004/0203601 A1 * | 10/2004 | Morriss et al. ............... | 455/411 |
| 2004/0203843 A1 | 10/2004 | Najafi | |
| 2006/0135058 A1 * | 6/2006 | Karabinis ..................... | 455/3.06 |
| 2007/0280167 A1 * | 12/2007 | Olexa et al. .................. | 370/331 |
| 2010/0151814 A1 * | 6/2010 | Bragg ........................ | 455/404.2 |
| 2011/0021173 A1 * | 1/2011 | Randhawa et al. ........ | 455/404.1 |
| 2012/0178403 A1 * | 7/2012 | Sieg et al. ................. | 455/404.1 |
| 2012/0182965 A1 * | 7/2012 | Das ....................... | H04W 48/14 370/331 |

FOREIGN PATENT DOCUMENTS

WO    2007008796    1/2007

OTHER PUBLICATIONS

International Preliminary Report on Patentability and Written Opinion in International Application No. PCT/GB2012/051605, dated Jan. 6, 2015, 6 pages.
International Search Report in International Application No. PCT/GB2012/051605, dated Sep. 30, 2013, 3 pages.

* cited by examiner

*Primary Examiner* — Dinh P Nguyen

(74) *Attorney, Agent, or Firm* — Fish & Richardson P.C.

(57) ABSTRACT

A portable communication device comprises a radio frequency signal transceiver configured to receive an instruction signal; and control electronics configured to detect that the instruction signal has been received; and cause the portable communication device to transmit a beacon signal responsive to the instruction signal being detected by the control electronics.

30 Claims, 8 Drawing Sheets

*FIG. 10(b)(ii)*

METHOD AND APPARATUS FOR ACTIVATING AN EMERGENCY BEACON SIGNAL

TECHNICAL FIELD

The embodiments disclosed herein relate generally to activating a beacon signal, and specifically to various methods and apparatus for activating an emergency beacon signal from a portable communication device.

BACKGROUND

When a natural or man-made catastrophe occurs, such as an earthquake or explosion, a critical task for rescue teams is to find victims affected by the catastrophe within the shortest period of time as possible, e.g. the first 24 hours which is the so-called 'golden day' during which the majority of survivors from the catastrophe can usually be saved. Very often, after such a catastrophe, victims are buried or trapped under rubble and debris and cannot be found. Rescue teams have traditionally relied on the use of dogs to locate such victims. Increasingly, rescue teams also make use of technology such as highly sensitive listening devices and ground probing radar to help locate victims. However, even with this technology it remains very difficult to locate victims across an entire area affected by a catastrophe, particularly within 24 hours of the catastrophe occurring.

It is therefore desirable to more easily identify a location of victims buried under rubble and debris after a catastrophic event.

BRIEF DESCRIPTION OF THE DRAWINGS

The present disclosure and the embodiments set out herein can be better understood with reference to the description of the embodiments set out below, in conjunction with the appended drawings, whereby.

DETAILED DESCRIPTION

Figure 1:
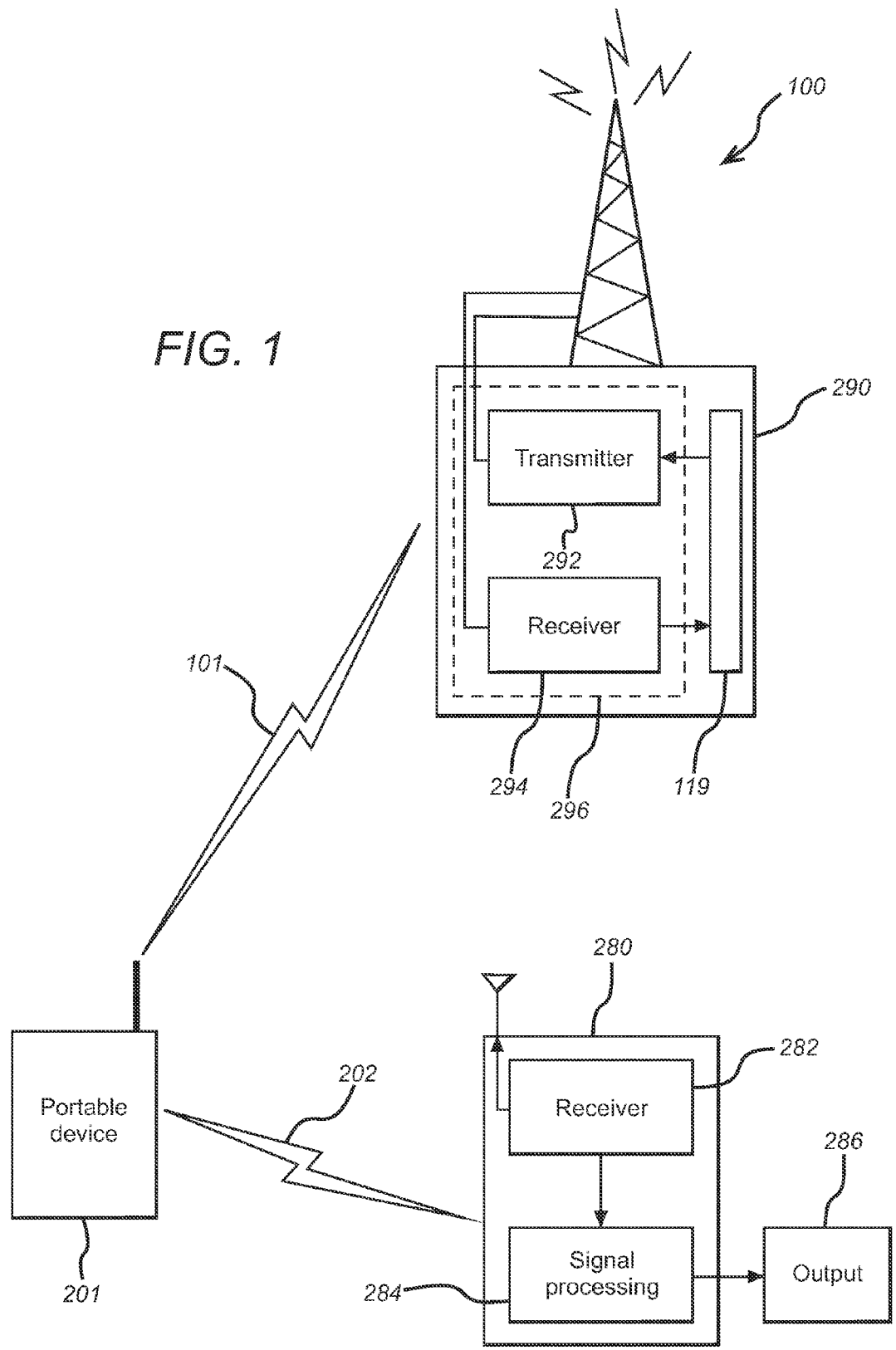
FIG. 1 is a schematic diagram illustrating components of a wireless communication network.

This disclosure describes various ways in which a portable communication device may send a beacon signal responsive to an instruction to transmit a beacon signal. The beacon signal may be used to locate the portable communication device in a localized area, such as in the area of a catastrophe. Various examples in this description are best described in relation to emergency response efforts. It should be understood that references to emergency beacon signal and emergency response are used as non-limited examples in this disclosure. Other non-catastrophic scenarios may be conceived which make use of the beacon signal for locating a portable communication device in a localized geographic area.

In a first aspect, there is provided a portable communication device. The portable communication devices comprises a radio frequency signal transceiver configured to receive an instruction signal; and control electronics configured to detect that the instruction signal has been received; and cause the portable communication device to transmit a beacon signal responsive to the instruction signal being detected by the control electronics. One or more portable communication devices within a given geographical area (e.g. an area affected by a catastrophe) can be instructed to transmit a beacon signal.

A portable communication device may be any electronic device which can be readily carried by a user with or on their person and which provides communication (e.g. voice, data or other electronic form) for its user to, from, or between other devices. The communication may be wireless, for example carried by radio frequency signals transmitted from and received by the device.

The control electronics may be further configured to switch the portable communication device between a first mode of operation and a second mode of operation, wherein in the second mode of operation, the control electronics controls the radio frequency signal transceiver to transmit the beacon signal.

In the first mode of operation, the control electronics may control the radio frequency signal transceiver to receive and transmit radio frequency signals within a first frequency range associated with a mobile communications network. If no instruction signal is received, the portable communication is used for transmitting and receiving voice signals and data, or voice signals only, or data only over the mobile communications network. As a result, the portable electronic device may be switched in the second mode of operation without any user interaction with the portable electronic device being required.

The radio frequency signal transceiver may be configured to transmit the beacon signal within a second frequency range which is different to the first frequency range. The beacon signal can therefore be readily distinguished from other voice signals and data being transmitted across the network. Furthermore, the second frequency range may be associated with at least one frequency reserved for emergency communications to allow emergency rescue teams to readily identify the beacon as an emergency beacon.

The radio frequency signal transceiver may be configured to transmit the beacon signal within a second frequency range, wherein the second frequency range overlaps at least a part of the first frequency range. Receivers capable of detecting or receiving communications from the portable communication device in the first mode can therefore also detect and receive the beacon signal.

In the second mode of operation, the control electronics may be configured to control the radio frequency signal transceiver to cease to receive and transmit the radio frequency signals of the first mode of operation and transmit only the beacon signal, or reduce the transmission capability (such as the power of transmission of the voice and data signals). Battery power is therefore conserved for transmitting the beacon signal only. Furthermore, in an emergency situation ceasing the transmission and receipt of data other than emergency beacons prevents overloading of the communications network which may be necessary following a catastrophic event.

When operating in the second mode of operation, the radio frequency signal transceiver may be configured to repeatedly transmit the beacon signal at predetermined time intervals, for example without any user interaction with the portable electronic device being required.

When operating in the second mode of operation the radio frequency signal transceiver may be configured to repeatedly transmit the beacon signal via a plurality of predetermined frequencies of the second frequency range.

The control electronics may be configured to switch the portable communication device from the first mode of operation to the second mode of operation in response to receiving a first instruction signal via the radio frequency signal transceiver from a remote location.

The control electronics may be configured to prompt for user input in response to the first instruction signal. The portable communication device may be configured to switch from the first mode of operation to the second mode of operation in the absence of a response to the prompt for user input within a predetermined time interval. Users not affected by the emergency situation can therefore prevent their portable communication devices from transmitting a beacon signal. Accordingly rescue efforts can be focused on users in need of assistance.

The control electronics may be further configured to provide a user input for receiving a user instruction to manually switch between the first mode of operation and the second mode of operation in response to the user instruction. Thus, users outside a specified area, but affected by an emergency situation, or whose portable communication devices did not correctly receive the instruction signal, can manually cause their portable communication devices to emit a beacon signal.

The portable communication device may be configured to switch back from the second mode of operation to the first mode of operation in response to a second instruction signal. In this case, one or both of the first instruction signal and the second instruction signal are received from a mobile communications network apparatus. In this manner, if an area is no longer undergoing an emergency situation, portable communications in this area can be controlled to cease transmitting an emergency beacon. For example, it is likely that some sub-areas within an area across which the emergency (or first) instruction signal is broadcast will be unaffected by the emergency situation. In this case, a mobile network apparatus can be used to cause devices in an area local to the network apparatus to cease transmitting a beacon signal. Accordingly, users truly in need of assistance can more readily be identified.

The mobile communications network apparatus may be one of: a wireless base station; a portable communications apparatus; or a short message service (SMS) message centre.

The second instruction signal may comprise a short message service (SMS) message received via a mobile communications network apparatus.

One or both of the first instruction signal and the second instruction signal may be a cell broadcast signal which is broadcast to all portable communication devices, or a predefined sub-group of all portable communication devices currently in communication with the mobile communications network apparatus, for example within a predefined area such as mobile cell, or subsection of the predefine area.

In one embodiment, the beacon signal may be a unidirectional signal transmitted from an antenna connected to the radio frequency signal transceiver. Such a unidirectional signal may be readily used to locate the location of the portable communication device once the signal has been detected. In another embodiment (which may be implemented separately or in conjunction with the preceding embodiment), the beacon signal may be completely unmodulated. In another embodiment (which may be implemented separately or in conjunction with the preceding two embodiments), the beacon signal may contain no data, or only very limited data. In another embodiment (which may be implemented separately or in conjunction with the preceding three embodiments), the beacon signal may be generated by the radio frequency transceiver at a fixed frequency, or within a fixed frequency range. In another embodiment (which may be implemented separately or in conjunction with the preceding three embodiments), the beacon signal may be multi-directional comprising a predetermined number of discrete unidirectional signals, transmitted, for example, in different directions from the antenna and each of which can be detected independently or together and thereby used to determine the location of the portable electronic device. Alternatively, the beacon signal may be completely omnidirectional.

In another embodiment (which may be implemented separately or in conjunction with the embodiments of the preceding paragraph), the beacon signal may be a signal transmitted at an radio frequency which is not at the frequency or in the range of frequencies used for conventional voice and data communications by the portable communications device, e.g. not at the frequency or in the range of frequencies used for conventional cellular-based communications. For example, the range of frequencies may be a range defined as being less than: 3 GHz, 2.5 GHz, 2 GHz, 1.5 GHz, 1.2 GHz, 1 GHz, 800 MHz, 500 MHz, 200 MHz, 100 MHz, 10 MHz, 1 MHz, 900 kHz, 800 kHz, 700 kHz, 600 kHz, 500 kHz, 400 kHz, 300 kHz, 200 kHz, 100 kHz, 50 kHz, 10 kHz, or 1 kHz, for example in the range: 1 kHz to 100 MHz, 2 kHz to 1 MHz, 10 kHz to 800 kHz, 100 kHz to 600 kHz, or 200 kHz to 500 kHz.

In another embodiment (which may be implemented separately or in conjunction with any one of the embodiments of the preceding two paragraphs), the beacon signal may comprise location data pertaining to the location of the portable communication device, wherein the location data is determined by the portable communication device. The location data may be determined by the portable communication device after receipt of the instruction signal. Alternatively, the location data may comprise data stored in the portable communication device that indicates a last determined location of the portable communication device. For example, the location of the portable communication may be determined at regular intervals when in the first mode of operation and the last known location used even when switched into the second mode of operation. Moreover, the location data may further comprise a timestamp associated with the last location data stored in the portable communication device.

The beacon signal may be a low power radio frequency signal. A low power frequency signal may be a signal defined as a signal having a short range. It may be a signal which is of an emitted strength which does not cause harmful interference to other radio equipment. It may be a signal emitted from a transmitter (or the transceiver) of the portable communications device with an effective radiated power (ERP) in the range: 5 to 500 mW, 10 to 300 mW, 15 to 200 mW or 25 to 100 mW.

The control electronics may be configured to cause a power level or modulation scheme of the beacon signal to be adapted in response to an amount of remaining battery power available to the portable communication device. The portable communication device may comprise a battery for powering the control electronics and radio frequency transceiver, and the control electronics may be configured to: determine an indication of remaining battery energy; and modify the transmission power of the beacon signal in accordance with the determined indication, or modify the modulation scheme of the beacon signal in accordance with the determined indication, or both. The modulation scheme may be changed so as to reduce the power requirements of the radio frequency transceiver in transmitting the beacon signal. In this manner, battery life of the portable communication device is used as efficiently as possible to maximize the duration for which a beacon signal can be transmitted.

The beacon signal may include identification information associated with the portable communication device, e.g. location information determined by a location determination means of the portable electronic device such as global positioning system (GPS) receiver or other satellite-signal based location determination receiver, or cellular based location determination means.

When operating in the second mode, the portable communication device may transmit the beacon signal to an emergency response center. In this manner, emergency rescue teams can use the beacon signal to determine one or more possible locations of the portable communication device.

The radio frequency signals transmitted within the first frequency range under the first mode of operation may comprise voice and/or data signals. For example, the radio frequency signals transmitted within the first frequency range may be associated with a mobile telecommunications network and may utilize standards-compliant radio frequency transmissions. For example, the range of frequencies may be a range defined as being less than: 3 GHz, 2.5 GHz, 2 GHz, 1.5 GHz, 1.2 GHz, 1 GHz, 800 MHz, 500 MHz, 200 MHz, 100 MHz, 10 MHz, 1 MHz, 900 kHz, 800 kHz, 700 kHz, 600 kHz, 500 kHz, 400 kHz, 300 kHz, 200 kHz, 100 kHz, 50 kHz, 10 kHz, or 1 kHz, for example in the range: 1 kHz to 100 MHz, 2 kHz to 1 MHz, 10 kHz to 800 kHz, 100 kHz to 600 kHz, or 200 kHz to 500 kHz.

The control electronics may be configured to transmit an acknowledgement signal in response to detecting that the instruction signal has been received.

In a second aspect a method of controlling a portable communication device is provided. The method comprises receiving an instruction signal; detecting that the instruction signal has been received; and causing the portable communication device to transmit a beacon signal responsive to detection of the instruction signal.

The method may further comprise operating the portable communication device in a first mode in which a radio frequency signal transceiver of the portable communication device is configured to receive and transmit data within a first frequency range; wherein receiving the instruction signal comprises receiving the instruction signal when operating the portable communication device in the first mode.

In response to the first instruction signal the method may further comprise switching the portable communication device to a second mode of operation, wherein in the second mode of operation the radio frequency signal transceiver operates under control of control electronics to transmit the beacon signal.

In the first mode of operation, the radio frequency signal transceiver may operate under control of the control electronics to receive and transmit radio frequency signals within a first frequency range associated with a mobile communications network. The radio frequency signal transceiver may transmit the beacon signal within a second frequency range which is different to the first frequency range. The second frequency range may be associated with at least one frequency reserved for emergency communications. For example, the range of frequencies may be a range defined as being less than: 3 GHz, 2.5 GHz, 2 GHz, 1.5 GHz, 1.2 GHz, 1 GHz, 800 MHz, 500 MHz, 200 MHz, 100 MHz, 10 MHz, 1 MHz, 900 kHz, 800 kHz, 700 kHz, 600 kHz, 500 kHz, 400 kHz, 300 kHz, 200 kHz, 100 kHz, 50 kHz, 10 kHz, or 1 kHz, for example in the range: 1 kHz to 100 MHz, 2 kHz to 1 MHz, 10 kHz to 800 kHz, 100 kHz to 600 kHz, or 200 kHz to 500 kHz.

The radio frequency signal transceiver may transmit the beacon signal within a second frequency range, wherein the second frequency range overlaps at least a part of the first frequency range. Alternatively, the second frequency range may be an unlicensed frequency range dedicated for emergency beacon signal transmissions and reserved for this purpose by one or more governmental entities. For example, the range of frequencies may be a range defined as being less than: 3 GHz, 2.5 GHz, 2 GHz, 1.5 GHz, 1.2 GHz, 1 GHz, 800 MHz, 500 MHz, 200 MHz, 100 MHz, 10 MHz, 1 MHz, 900 kHz, 800 kHz, 700 kHz, 600 kHz, 500 kHz, 400 kHz, 300 kHz, 200 kHz, 100 kHz, 50 kHz, 10 kHz, or 1 kHz, for example in the range: 1 kHz to 100 MHz, 2 kHz to 1 MHz, 10 kHz to 800 kHz, 100 kHz to 600 kHz, or 200 kHz to 500 kHz.

The portable communication device may be a personal communications device, mobile phone, smartphone, personal digital assistant, tablet device or laptop. The portable communications device may comply with and transmit radio frequency signals (for voice communications, data communications, or both), receive radio frequency signals (for voice communications, data communications, or both), or both, via its radio frequency transceiver according to one or more of the mobile communications network technologies, for example those technologies having associated, standardised frequency bands defined for one or more of: Global System for Mobile Communications (GSM), Enhanced Data Rates for GSM Evolution (EDGE), General Packet Radio Service (GPRS), 3rd Generation Mobile Telecommunications (3G), Long Term Evolution (LTE), Universal Mobile Telecommunications System (UMTS).

In the second mode of operation, the radio frequency signal transceiver may operate under control of the control electronics to cease to receive and transmit the radio frequency signals of the first mode of operation.

When operating in the second mode of operation, the beacon signal at predetermined time intervals may be repeatedly transmitted.

When operating in the second mode of operation the radio frequency signal transceiver may operate under the control of the control electronics to repeatedly transmit the beacon signal via a plurality of predetermined frequencies of the second frequency range.

The method may comprise switching the portable communication device from the first mode of operation to the second mode of operation in response to receiving a first instruction signal via the radio frequency signal transceiver from a remote location.

The control electronics may prompt for user input in response to the first instruction signal. The control electronics may further provide a user input for receiving a user instruction to manually switch between the first mode of operation and the second mode of operation in response to the user instruction.

The portable communication device may switch from the first mode of operation to the second mode of operation in the absence of a response to the prompt for user input within a predetermined time interval. The portable communication device may also switch from the second mode of operation to the first mode of operation in response to a second instruction signal.

One or both of the first instruction signal and the second instruction signal may be received from a mobile communications network apparatus. The mobile communications network apparatus may be one of a wireless base station; a portable communications apparatus; or a short message service (SMS) message centre.

The beacon signal may be received by a beacon signal receiver device which comprises a receiver configured to receive the beacon signal and determine, or assist a user in determining the location of the portable communication device, for example by indicating a direction on a display or via other indicator means of the location from where the beacon signal has been transmitted, or by indicating the determined location on a display or via other indicator means of the location of the portable communication device, e.g. on a map display, or with alphanumeric or graphical means displayed on the display.

The second instruction signal may comprise a short message service (SMS) message received via a mobile communications network apparatus.

One or both of the first instruction signal and the second instruction signal may be a cell broadcast signal which is broadcast to all portable communication devices, or a predefined sub-group of all portable communication devices currently in communication with the mobile communications network apparatus.

The method may further comprise determining location data pertaining to a location of the portable communication device and including the determined location in the beacon signal.

Determining location data pertaining to a location of the portable communication device may comprise retrieving data indicating a last determined location of the portable communication device; and including the retrieved data in the beacon signal.

Including the retrieved data in the beacon signal may comprise including a timestamp associated with the retrieved data indicating the last determined location in the beacon signal.

The beacon signal may be a low power radio frequency signal, and the control electronics may cause a power level or modulation scheme of the beacon signal to be adapted in response to an amount of remaining battery power available to the portable communication device.

In one example, the portable communication device comprises a battery and the method comprises determining an indication of remaining battery energy; and modifies the transmission power of the beacon signal in accordance with the determined indication.

The method may further comprise including identification information associated with the portable communication device in the beacon signal.

When operating in the second mode, the portable communication device may transmit the beacon signal to an emergency response center.

The radio frequency signals transmitted within the first frequency range under the first mode of operation may comprise voice and/or data signals.

The control electronics may transmit an acknowledgement signal in response to detecting that the instruction signal has been received.

In a third aspect there is provided a method comprising, in a mobile communications network apparatus transmitting a first instruction signal via a radio frequency signal transceiver, the first instruction signal for instructing at least one portable communication device to transmit a beacon signal on detection of the first instruction signal.

The method may further comprise instructing with the first instruction signal at least one portable communication device to switch from a first mode of operation, in which the portable communication devices receive and transmit data within a first frequency range, to a second mode of operation in which the portable communication devices transmit a beacon signal using a second frequency range different to the first frequency bandwidth.

The method may further comprise transmitting a second instruction signal to at least one of the plurality of portable communications devices, the second instruction signal adapted to cause at least one device to revert to the first mode of operation.

One or both of the first instruction signal and the second instruction signal may comprise a cell broadcast signal.

One or both of the first instruction signal and the second instruction signal may comprise a short message service (SMS) message.

In a fourth aspect, there is provided an apparatus comprising a transmitter configured to broadcast a first instruction signal via a radio frequency signal, wherein the first instruction signal is associated with instructing at least one portable communication device to transmit a beacon signal on detection of the first instruction signal.

The first instruction signal may be adapted to signal the plurality of portable communication devices to switch from a first mode of operation, in which the portable communication devices are configured to receive and transmit communication data, to a second mode of operation in which the portable communication devices transmit the beacon signal.

In a fifth aspect, there is provided a wireless base station comprising the above-described apparatus and further comprising a receiver, wherein the transmitter and receiver together provide a transceiver configured for transmitting and receiving data for cellular wireless services.

The wireless base station may be a microcell wireless base station configured to broadcast to a local area.

In a sixth aspect, a beacon signal receiver device comprises a radio frequency receiver configured to receive a beacon signal and determine, or assist a user in determining, the location of the portable communication device, for example by indicating a direction on a display of the beacon signal receiver, or via other indicator means of the beacon signal receiver, of the location from where the beacon signal has been transmitted, or by indicating the determined location on the display or via the other indicator means of the location of the portable communication device, e.g. on a map display, or with alphanumeric or graphical means displayed on the display.

Reference is made to FIG. 1 which illustrates a system 100 utilising a wireless communication network 101 according to an example embodiment. An electronic device 201 of the system 100 communicates with any one of a plurality of base stations 290 of the system 100 over the wireless network 101, which may be a mobile communications network such as a cellular network, or a WiFi network. The base station 290 comprises a transmitter 292 and a receiver 294. The transmitter 292 and the receiver 294 may be included within an integrated transceiver 296 of the base station 290. The transmitter 292 and receiver 294 may be connected to base station control electronics 119 which is configured to control the sending and receiving voice signals or data, or both, to and from the electronic device 201 over the wireless network 101. The base station control electronics can be configured to control the transmitter 292 to transmit an emergency beacon mode instruction signal (see below) to the electronic device 201 so as to place it in an emergency beacon mode of operation in which the electronic device 201 transmits a beacon signal 202.

The system 100 may also comprise a beacon signal receiver device 280 which comprises a receiver 282 in communication with signal processing electronics 284. The receiver 282 of the beacon signal receiver device 280 in conjunction with the signal processing electronics may constitute a beacon signal measuring device, (e.g. a device which measures, at the device's current location, characteristics, such as any one or more of signal power, frequency and modulation type), a beacon signal detecting device (e.g. a device which detects the presence of the beacon signal at the device's current location), a beacon locating device (e.g. a device which detects the location from where the beacon signal has been transmitted).

The receiver 282 may be configured to receive the beacon signal 202. The signal processing electronics 284 may be configured to process the received beacon signal 202 and determine a location of the electronic device 201, or a direction from the receiver device 280 to the electronic device 201. Output from the signal processing electronics 284 may be data pertaining to the location of the electronic device 201, or data indicative of a direction from the receiver device 280 to the electronic device 201. Such data can be utilised and displayed on a display. The beacon signal receiver device may be portable so that it can be carried by an emergency worker to locate the portable device and its user.

Figure 2:
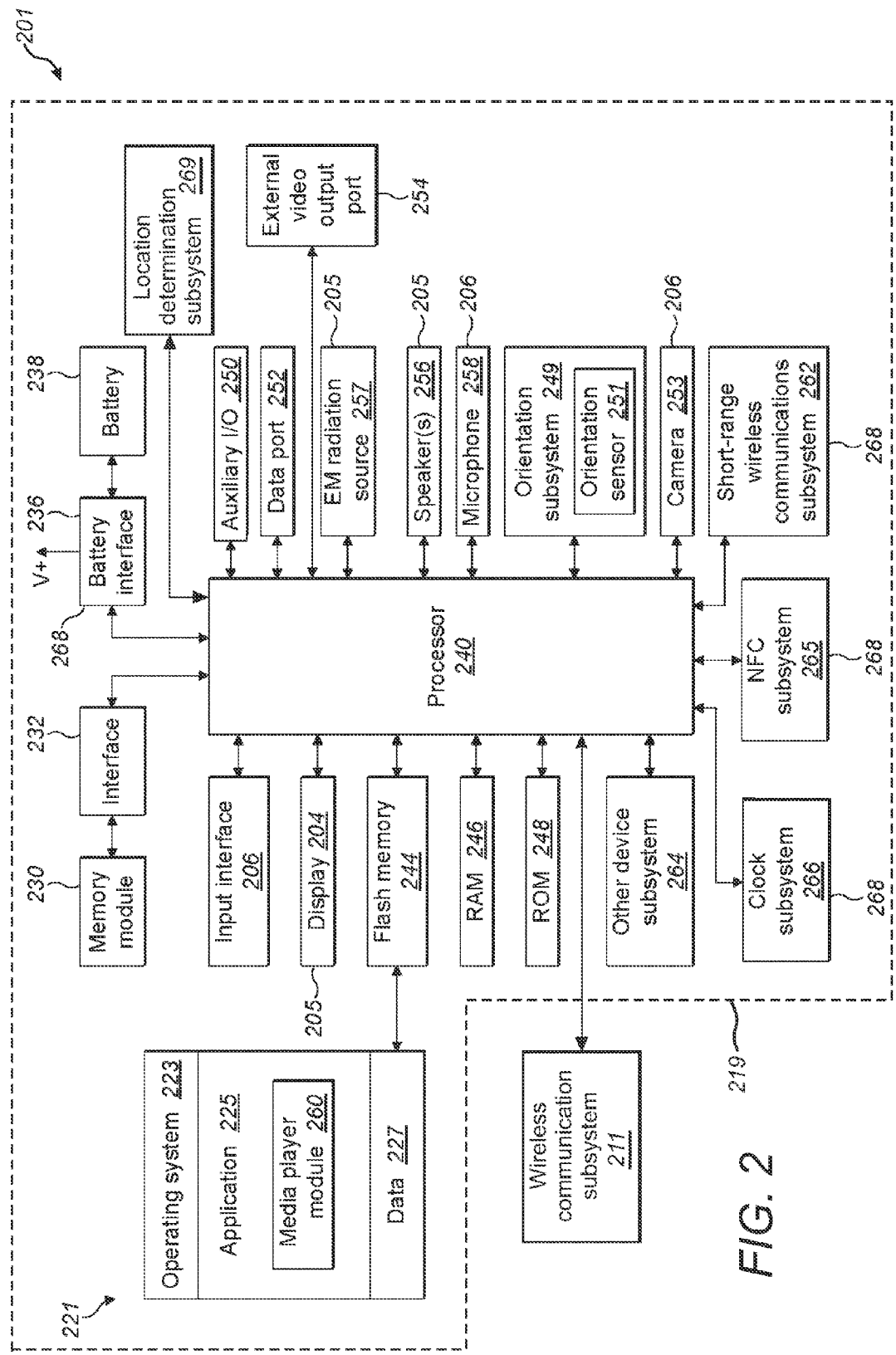
FIG. 2 is a schematic diagram illustrating components of an example electronic device in accordance with some embodiments.

FIG. 2 is a schematic diagram illustrating components of an example electronic device 201. In this example embodiment, the electronic device 201 is a mobile or portable communication device having data and voice communication capabilities, and the capability to communicate with other computer systems; for example, via the Internet.

It will be appreciated that the electronic device 201 may take other forms, including any one of the forms listed below. Depending on the functionality provided by the electronic device 201, in certain example embodiments, the electronic device 201 is a multiple-mode communication device configured for both data and voice communication, a mobile telephone, such as a smartphone, a wearable computer such as a watch, a tablet computer, a personal digital assistant (PDA), or a computer system such as a notebook, laptop or desktop system. The electronic device 201 may take other forms apart from those specifically listed above. The electronic device 201 may also be referred to as a mobile communications device, a communication device, a mobile device and, in some cases, as a device. In the context of this disclosure, the term "mobile" means the device is of a size or weight which makes it readily portable by a single individual, e.g. of a weight less than 5, 4, 3, 2, 1, 0.5, 0.4, 0.3, 0.2 or 0.1 kilograms, or of a volume less than 15,000, 10,000, 5,000, 4,000, 3,000, 2,000, 1,000, 500, 400, 300, 200, 100, 90, 80, 70, 60, 50, 40, 30, 20, 10 or 5 cubic centimeters. As such, the device 201 may be portable in a bag, or clothing pocket, in a holster or just carried by the user.

The electronic device 201 comprises control electronics 219 including a processor 240 (such as a microprocessor) which controls the operation of the electronic device 201. In certain electronic devices, more than one processor 240 may be utilised, with each processor in communication with each other and configured to perform operations in parallel, so that they together control the overall operation of the electronic device. However, for the purposes of this disclosure it will suffice to describe the functionality of the electronic device 201 within the context of a single processor 240 being utilised.

The processor 240 interacts with device subsystems, such as a wireless communication subsystem 211 for exchanging radio frequency signals with a wireless network 101 to perform communication functions. The processor 240 is communicably coupled with additional device subsystems including one or more output interfaces 205 (such as one or more of: a display 204, a speaker 256, electromagnetic (EM) radiation source 257), one or more input interfaces 206 (such as one or more of: a camera 253, microphone 258, keyboard (not shown), control buttons (not shown), a navigational input device (not shown), a touch-sensitive overlay (not shown)) associated with a touchscreen 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), an external video output port 254, a near field communications (NFC) subsystem 265, a short-range communication subsystem 262, a clock subsystem 266, a battery interface 236, and other device subsystems generally designated as 264. Some of the subsystems shown in FIG. 2 perform communication-related functions, whereas other subsystems may provide "resident" or on-device functions.

The electronic device 201 stores data 227 in an erasable persistent memory, which in one example embodiment is the flash memory 244. In various example embodiments, the data 227 includes service data including information used by the electronic device 201 to establish and maintain communication with the wireless network 101. The data 227 may also include user application data such as email messages, address book and contact information, calendar and schedule information, notepad documents, presentation documents and information, word processor documents and information, spread sheet documents and information; desktop publishing documents and information, database files and information; image files, video files, audio files, internet web pages, and other commonly stored user information stored on the electronic device 201 by its user, and other data. The data may also include program application data such as functions, controls and interfaces from an application such as an email application, an address book application, a calendar application, a notepad application, a presentation application, a word processor application, a spread sheet application, a desktop publishing application, a database application, a media application such as a picture viewer, a video player or an audio player, and a web browser. The data 227 stored in the persistent memory (e.g. flash memory 244) of the electronic device 201 may be organized, at least partially, into one or more databases or data stores. The databases or data stores may contain data items of the same data type or associated with the same application. For example, email messages, contact records, and task items may be stored in individual databases within the device memory.

The electronic device 201 includes a clock subsystem or module 266 comprising a system clock configured to measure system time. In one example, the system clock comprises its own alternate power source. The system clock provides an indicator of a current time value, the system time, represented as a year/month/day/hour/minute/second/milliseconds value. In other examples, the clock subsystem 266 additionally or alternatively provides an indicator of the current time value represented as a count of the number of ticks of known duration since a particular epoch.

The clock subsystem 266, the communication subsystem 211, the NFC subsystem, 265, the short-range wireless communications subsystem 262, and the battery interface 236 together form a status report subsystem 268 which is configured to provide an indicator of the operating status of the device.

The display 204 receives display data generated by the processor 240, such that the display 204 displays certain application data stored as a segment of the data 227 from the memory (any of the flash memory 244, random access memory (RAM) 246, read only memory (ROM) 248) in a predetermined way on display screen (not shown) of the display 204, according to the processing performed by the processor 240.

In some example embodiments of the invention, the auxiliary input/output (I/O) subsystems 250 include an external communication link or interface; for example, an Ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments of the invention, the electronic device 201 also includes a removable memory module 230 (typically including flash memory, such as a removable memory card) and a memory interface 232. Network access may be associated with a subscriber or user of the electronic device 201 via the memory module 230, which may be a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

The data port 252 may be used for synchronization with a user's host computer system (not shown). The data port 252 enables a user to set preferences through an external device or software application and extends the capabilities of the electronic device 201 by providing for information or software downloads to the electronic device 201 other than through the wireless network 101. The alternate download path may for example, be used to load an encryption key onto the electronic device 201 through a direct, reliable and trusted connection to thereby provide secure device communication.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation (or location) of the device 201 or information from which the orientation (or location) of the device 201 can be determined, such as acceleration. In some example embodiments of the invention, the orientation sensor 251 is an accelerometer, such as a three-axis accelerometer. An accelerometer is a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth. Additionally or alternatively, the orientation sensor 251 may generate orientation data which specifies the orientation of the device relative to known locations or fixtures in a communication network.

In some example embodiments of the invention, the orientation subsystem 249 causes the processor 240 to store the orientation data in one of the flash memory 244, the RAM 246 or the ROM 248. The clock subsystem 266 may generate a timestamp indicative of the time of generation of the orientation data and this timestamp may additionally be stored in a memory of the device 201.

In some example embodiments of the invention, the orientation subsystem 249 includes other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments of the invention, the device orientation subsystem 249 may include two or more orientation sensors 251 such as an accelerometer and an electronic compass.

The electronic device 201 may include a location determination subsystem 269 which is configured to determine the specific location of the electronic device 201 in space, e.g. on the surface, above, or below the earth. The location determination subsystem 269 may comprise a global positioning system (GPS), or other satellite signal based location determination means, or cellular or radio frequency based location determination means. The location determination subsystem 269 may determine the location of the electronic device in the form of longitude, latitude and altitude above or below sea level, and pass corresponding data pertaining to this location to the processor 240.

The electronic device 201, in at least some example embodiments, includes a Near-Field Communication (NFC) subsystem 265. The NFC subsystem 265 is configured to communicate with other electronic devices 201 or tags, using an NFC communications protocol. NFC is a set of short-range wireless technologies which typically require a distance of 4 cm or less for communications. The NFC subsystem 265 may include an NFC chip and an NFC antenna. In such an embodiment, the orientation sensor 251 may generate data which specifies a distance between the electronic device 201 and an NFC transceiver.

The electronic device 201 includes a microphone or one or more speakers. In at least some example embodiments, an electronic device 201 includes a plurality of speakers 256. For example, in some example embodiments, the electronic device 201 includes two or more speakers 256. The two or more speakers 256 may, for example, be disposed in spaced relation to one another. That is, in at least some example embodiments, the electronic device 201 may include a first speaker and a second speaker and the first speaker and the second speaker may be spatially separated from one another within the electronic device 201. In at least some example embodiments, the display 204 may be disposed between the first speaker and the second speaker of the electronic device. In such example embodiments, the first speaker may be located at one side of the display 204 and the second speaker may be located at another side of the display which is opposite the side of the display where the first speaker is located. For example, the first speaker may be disposed at a left side of the display and the second speaker may be disposed at a right side of the display.

In at least some example embodiments, each speaker 256 is associated with a separate audio channel. The multiple speakers may, for example, be used to provide stereophonic sound (which may also be referred to as stereo).

The electronic device 201 may also include one or more cameras 253. The one or more cameras 253 may be capable of capturing images in the form of still photographs or motion video.

In at least some example embodiments, the electronic device 201 includes a front facing camera 253. A front facing camera is a camera which is generally located on a front face of the electronic device 201. The front face is typically the face on which a display 204 is mounted. That is, the display 204 is configured to display content which may be viewed from a side of the electronic device 201 where the camera 253 is directed. The front facing camera 253 may be located anywhere on the front surface of the electronic device; for example, the camera 253 may be located above or below the display 204. The camera 253 may be a fixed position camera which is not movable relative to the display 204 of the electronic device 201 or the housing of the electronic device 201. In such example embodiments, the direction of capture of the camera is always predictable relative to the display 204 or the housing. In at least some example embodiments, the camera may be provided in a central location relative to the display 204 to facilitate image acquisition of a face.

In at least some example embodiments, the electronic device 201 includes an electromagnetic (EM) radiation source 257. In at least some example embodiments, the EM radiation source 257 is configured to emit electromagnetic radiation from the side of the electronic device which is associated with a camera 253 of that electronic device 201. For example, where the camera is a front facing camera 253, the electronic device 201 may be configured to emit electromagnetic radiation from the front face of the electronic device 201. That is, in at least some example embodiments, the electromagnetic radiation source 257 is configured to emit radiation in a direction which may visible by the camera. That is, the camera 253 and the electromagnetic radiation source 257 may be disposed on the electronic device 201 so that electromagnetic radiation emitted by the electromagnetic radiation source 257 is visible in images detected by the camera.

In some example embodiments of the invention, the electromagnetic radiation source 257 is an infrared (IR) radiation source which is configured to emit infrared radiation. In at least some example embodiments, the electromagnetic radiation source 257 may be configured to emit radiation which is not part of the visible spectrum. The camera 253 may be a camera which is configured to capture radiation of the type emitted by the electromagnetic radiation source 257. Accordingly, in at least some example embodiments, the camera 253 is configured to capture at least some electromagnetic radiation which is not in the visible spectrum.

In some example embodiments of the invention, the electronic device 201 is provided with a service routing application programming interface (API) which provides an application with the ability to route traffic through a serial data (i.e., USB) or Bluetooth® (Bluetooth® is a registered trademark of Bluetooth SIG, Inc.) connection to a host computer system using standard connectivity protocols. When a user connects their electronic device 201 to the host computer system via a USB cable or Bluetooth® connection, traffic that was destined for the wireless network 101 is automatically routed to the electronic device 201 using the USB cable or Bluetooth® connection. Similarly, any traffic destined for the wireless network 101 is automatically sent over the USB cable Bluetooth® connection to the host computer system for processing.

The electronic device 201 also includes a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 includes a short-range communication subsystem 262 which provides for wireless communication between the electronic device 201 and other electronic devices 201. In at least some example embodiments, the short-range communication subsystem 262 is a wireless bus protocol compliant communication mechanism such as a Bluetooth® communication module to provide for communication with similarly-enabled systems and devices.

Any one or more of the communication subsystem 211, the NFC subsystem 265 and the short-range wireless communications subsystem 262 serves as a "communication subsystem" which is configured to provide an indicator of the number of incoming messages being received by the electronic device 201. The incoming messages may be emails, messages received via a social networking website, SMS (short message service) messages, or telephone calls, for example.

The processor 240 operates under stored program control and executes software modules 221 stored in memory such as persistent memory; for example, in the flash memory 244. As illustrated in FIG. 2, the software modules 221 include operating system software 223 and other software applications 225 such as a media player module 260. In the example embodiment of FIG. 2, the media player module 260 is implemented as a stand-alone application 225. However, in other example embodiments, the presentation module 260 could be implemented as part of the operating system 223 or other applications 225.

Figure 3A:
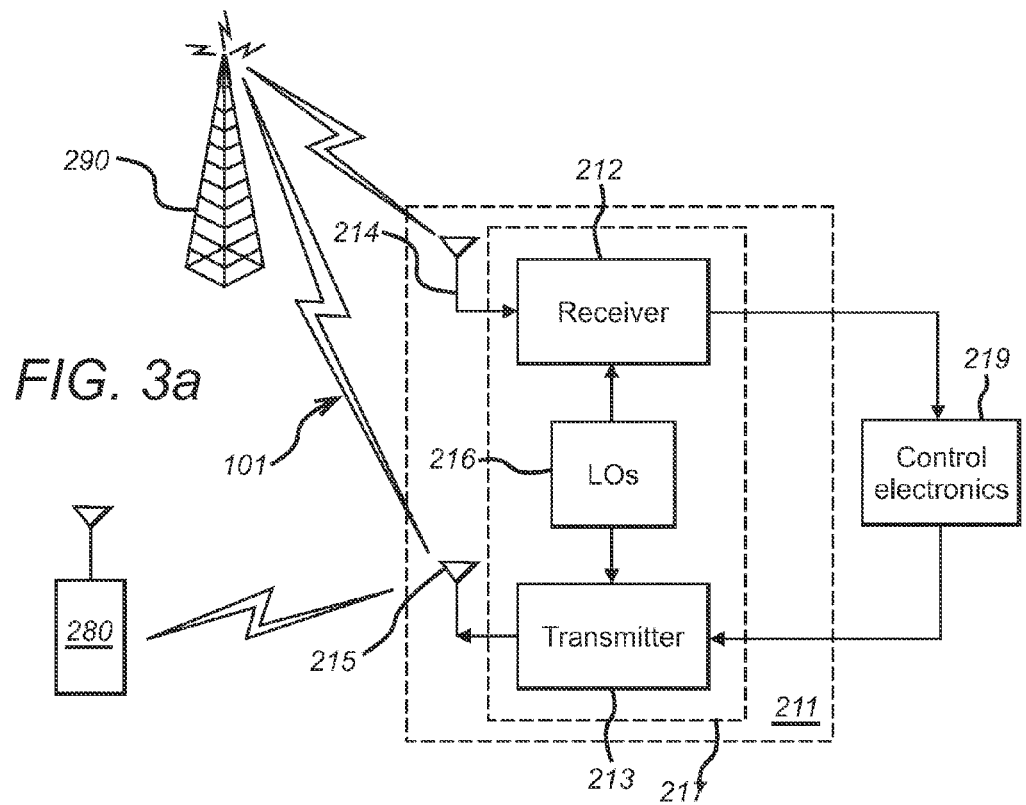
FIG. 3a is a schematic diagram illustrating components of an example electronic device in accordance with in some embodiments.

FIG. 3a depicts the communication subsystem 211 of the electronic device 201 in further detail. The communication subsystem 211 allows the electronic device 201 to communicate over the wireless network 101 under the control of the control electronics 219 connected thereto. The communication subsystem 211 includes a radio frequency transceiver 217 and associated components, such as one or more antenna elements 214 and 215. The transceiver 217 comprises a receiver 212, a transmitter 213 and Local Oscillators (LOs) 216 connected thereto. The antenna elements 214 and 215 may be embedded or internal to the electronic device 201 and a single antenna may be shared by both receiver and transmitter. The particular design of the wireless communication subsystem 211 depends on the wireless network 101 in which the electronic device 201 is intended to operate.

The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (ND) conversion. ND conversion of a received signal allows more complex communication functions such as demodulation and decoding to be performed under the control of the control electronics 219. In a similar manner, signals to be transmitted are processed under the control of the control electronics 219, including modulation and encoding. The processed signals are input to the transmitter 213 for digital-to-analog (D/A) conversion, frequency up conversion, filtering, amplification, and transmission to the wireless network 101 via the antenna 215. The control electronics 219 provides for receiver and transmitter control. For example, the gains applied to communication signals in the receiver 212 and the transmitter 213 may be adaptively controlled through automatic gain control algorithms.

The control electronics 219 can have any of a number of alternative arrangements. For example, the control electronics 219 may comprise program control software stored in one of the RAM 246, ROM 248 or flash memory 244. In this example, the processor 240 operates under the control of the stored program control software to perform the above described steps of receiving and transmitting. In a further example embodiment, the control electronics 219 comprises an integrated circuit such as an ASIC mounted on the electronic device 201. It will be appreciated that the specific form of the control electronics 219 is not important. Instead, the important feature of the control electronics 219 is that it is configured to perform the described functions.

Figure 3B:
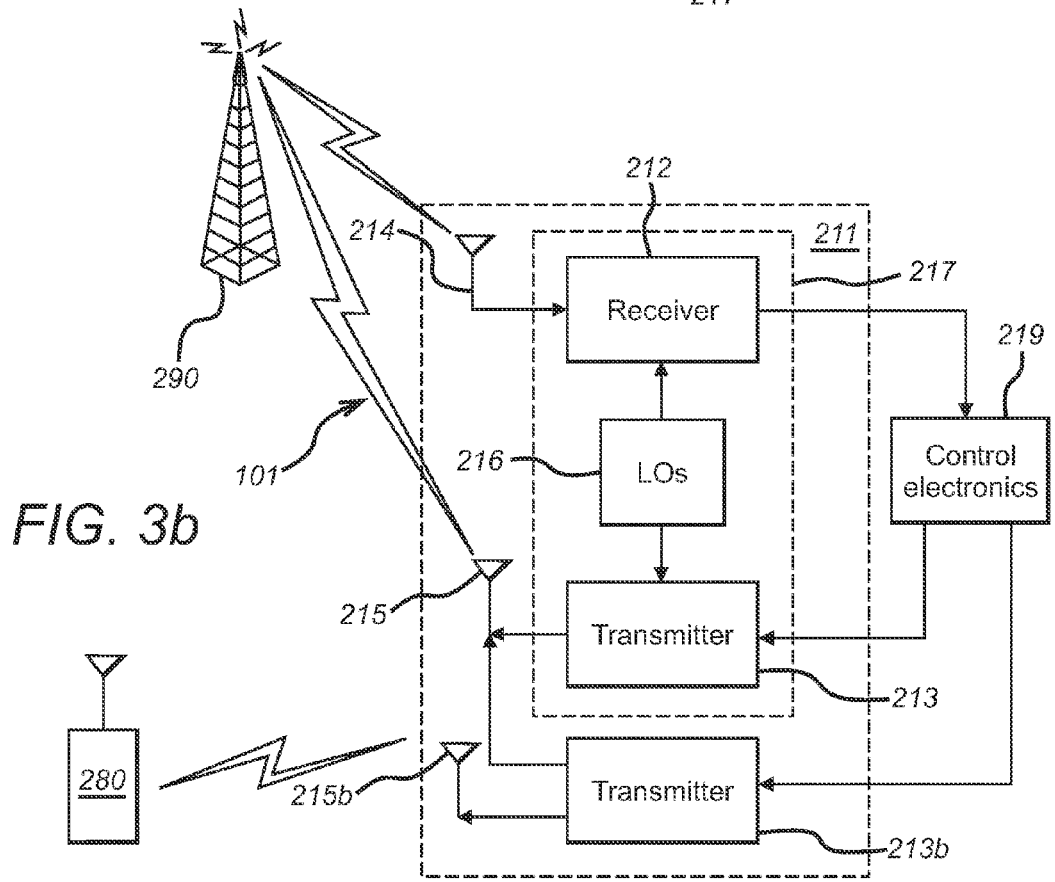
FIG. 3b is a schematic diagram illustrating components of an example electronic device in accordance with in some embodiments.

As depicted in FIG. 3b, in some example embodiments of the invention, the communication subsystem 211 comprises a second transmitter 213b. Furthermore, in addition to the first transmit antenna 215, the communication subsystem may additionally comprise a second transmit antenna 214b. It will be appreciated that the second transmitter 213b may be an individual transmitter component or a subcomponent of a second transceiver (not shown). In this embodiment, the control electronics 219 operates as described above to perform any necessary processing of the signal to be transmitted. However, in this case either the first transmitter 213 or the second transmitter 213b then transmits the signal via one or both of the first transmit antenna 215 and the second transmit antenna 215b. The second transmitter 213b and second antenna 215b may be configured solely for transmission of a beacon signal (see below), whilst the first transmitter 213 and 213b may be configured solely for transmission of voice signals, or data signals, or both.

The electronic device 201 is, in some example embodiments, a portable communication device which may provide three principal modes of communication: a data communication mode, a voice communication mode and an emergency beacon mode which are each set and activated or deactivated under the control of the control electronics 219. In the data communication mode, a received data signal received over the wireless network 101, such as a text message, an email message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 can compose data items, such as email messages; for example, using the input devices in conjunction with the display 204. These composed items may be transmitted through the communication subsystem 211 over the wireless network 101.

In the voice communication mode, the electronic device 201 provides telephony functions and operates as a typical cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

In the emergency beacon mode, the electronic device 201 outputs the beacon signal 202 via the transmitter 213, the second transmitter 213b or both the transmitter 213 and the second transmitter 213b. As discussed in more detail below, the beacon signal 202 may take any form that allows a rescue team to detect the signal and identify an area, location or exact location from which the signal has originated. For example, the rescue team may use direction finding receivers, triangulation techniques or any other suitable receiver capable of localising a signal source, for example the hereinbefore described beacon signal receiver 280.

Figure 4:
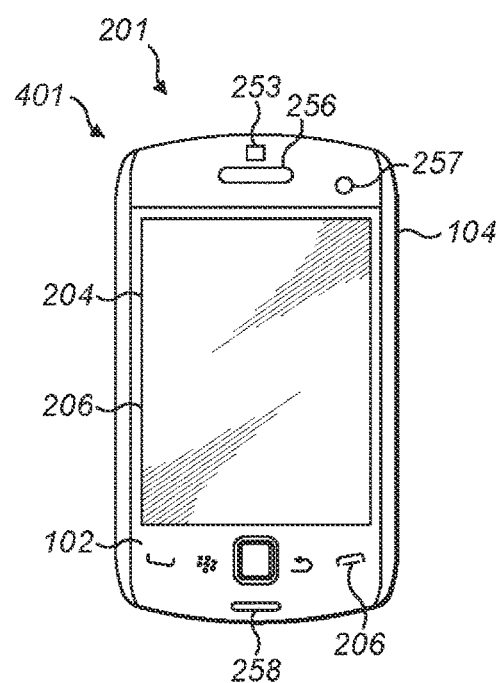
FIG. 4 is a plan view of the upper external side of one example electronic device in accordance with in some embodiments.

Referring now to FIG. 4, a front view of an example electronic device 201 being a portable communication device, which in one example may be a smartphone 100 is illustrated. The smartphone 100 is a mobile phone which offers more advanced computing capability than a basic non-smartphone cellular phone. For example, the smartphone 100 may have the ability to run third party applications which are stored on the smartphone.

The smartphone 100 includes all of the components discussed above with reference to FIG. 2, or a subset of those components. The smartphone 100 includes a housing 104 which houses at least some of the components discussed above with reference to FIG. 1.

In the example embodiment of FIG. 4, the smartphone includes a display 204, which may be a touchscreen which acts as an input interface 206. The display 204 is disposed within the smartphone 100 so that it is viewable at a front side 102 of the smartphone 100. That is, a viewable side of the display 204 is disposed on the front side 102 of the smartphone. In the example embodiment illustrated, the display 204 is framed by the housing 104.

The example smartphone 100 also includes other input interfaces 206 such as one or more buttons, keys or navigational input mechanisms. In the example illustrated, at least some of these additional input interfaces 206 are disposed for actuation at a front side 102 of the smartphone.

The example smartphone also includes a speaker 256. In the example embodiment illustrated, the smartphone includes a single speaker 256 which is disposed vertically above the display 204 when the smartphone 100 is held in a portrait orientation where its height is longer than its width. The speaker 256 may be disposed on the front face of the smartphone 100.

While the example smartphone 100 of FIG. 4 includes a single speaker 256, in other example embodiments, the smartphone 100 may include a greater number of speakers 256. For example, in at least some example embodiments, the smartphone 100 may include a second speaker 256 which is disposed vertically below the display 204 when the smartphone is held in a portrait orientation where its height is longer than its width (i.e. the orientation illustrated in FIG. 4).

The example smartphone 100 also includes a microphone 258. In the example illustrated, the microphone 258 is vertically disposed below the display 204 when the smartphone is held in the portrait orientation. The microphone 258 and at least one speaker 256 may be arranged so that the microphone is in close proximity to a user's mouth and the speaker 256 is in close proximity to a user's ear when the user holds the phone to their face to converse on the smartphone.

The example smartphone 100 also includes a front facing camera 253 which may be located vertically above the display 204 when the smartphone 100 is held in a portrait orientation where its height is longer than its width. The front facing camera 253 is located so that it may capture images of objects which are located in front of or surrounding the front side of the smartphone 100.

The example smartphone 100 also includes an electromagnetic radiation source 257. The electromagnetic radiation source 257 is disposed on the front side 102 of the smartphone 100. In this orientation, electromagnetic radiation which is produced by the electromagnetic radiation source 257 may be projected onto objects which are located in front of or surrounding the front side of the smartphone 100. Such electromagnetic radiation (or the projection of electromagnetic radiation onto objects) may be captured on images detected by the camera 253.

After several disasters round the world, it has been observed that portable communication devices, particularly smartphones of victims buried under rubble and debris continued to operate. Smartphone users generally keep their devices on their person or in close proximity and it is likely that such a device will be in close proximity to a victim buried under rubble and debris after a catastrophic event.

Figure 5:
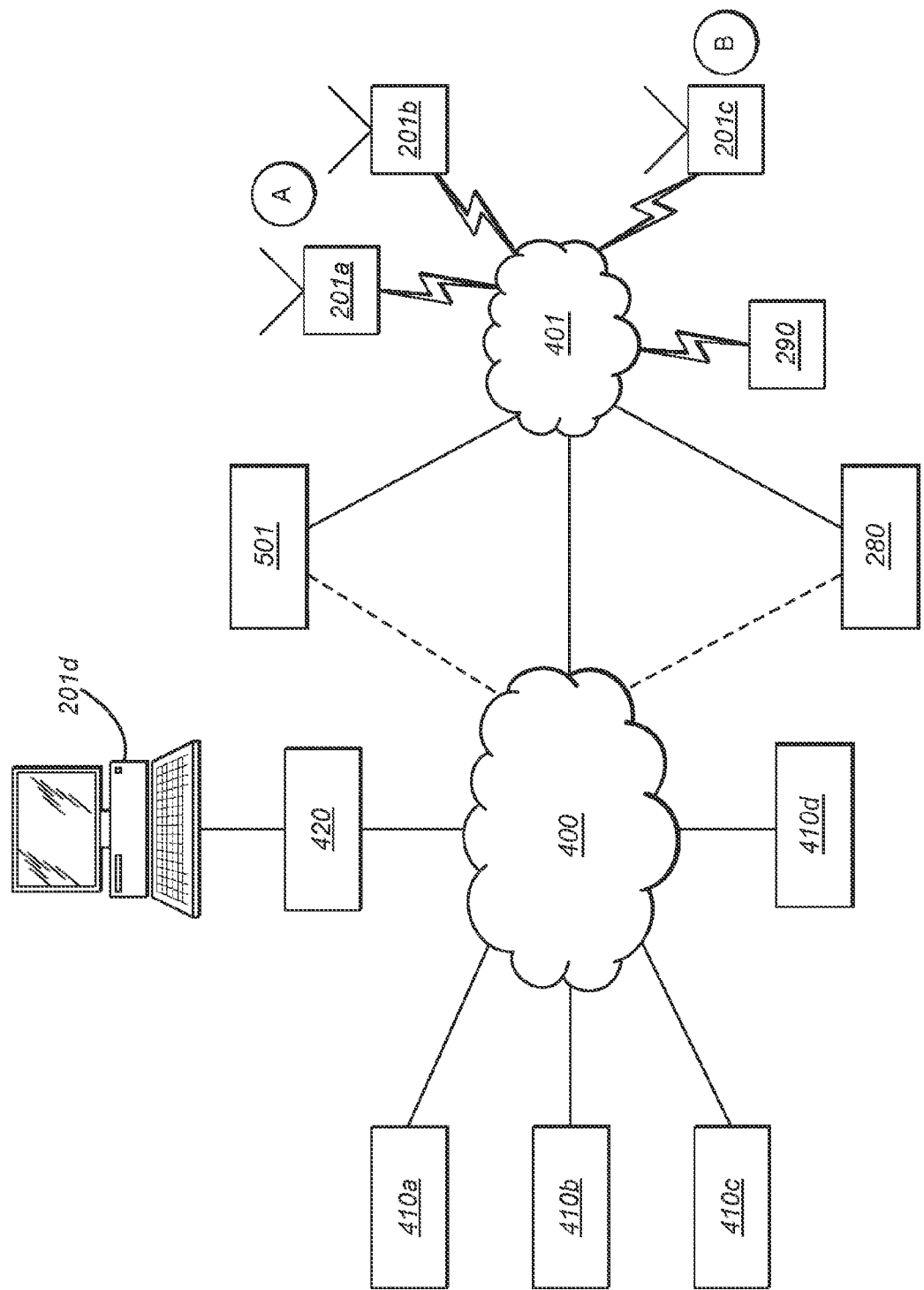
FIG. 5 is a schematic diagram of an example system in which the aforementioned electronic devices can be employed in some example embodiments.

FIG. 5 shows a system of networked apparatus by which electronic communications can be sent and received using multiple electronic devices 201a, 201b, 201c. Referring to FIG. 5, electronic devices 201a, 201b and 201c are connected to wireless network 101 to perform voice and data communications and transmit the beacon signal. Wireless network 101 is also connected to the Internet 400. Electronic devices 201b and 201c may be smartphones. Electronic device 201d is a computing device such as a notebook, laptop or desktop, which is connected by a wired broadband connection to Local Area Network 420, and which is also connected to the Internet 400. Electronic devices 201a, 201b, 201c, 201d may access the Internet 400 to perform data communications therewith.

In some example embodiments of the invention, an Emergency Rescue Centre (ERC) transmitter 501 is also connected to the wireless network 101, the internet 400 or both the wireless network 101 and the Internet 400. The ERC transmitter 501 may be configured to transmit the beacon mode instruction signal (see below) on command via the Internet 400 or directly via wireless network 101 to one or more of the electronic devices 201a, 201b, 201c, 201d, for example one or more of particular electronic devices which are located within a specific location whilst being connected to the wireless network 101. As a result, the particular electronic devices may each be placed in their emergency beacon mode, each transmitting its beacon signal 202 over the wireless network 101, Internet 400 or separately to these networks as a defined radio frequency beacon signal having particularly signal characteristics (see below).

The beacon signal receiver device 280 may also be connected to the wireless network 101 or Internet 400, or both. As mentioned above, the beacon signal receiver device 280 may receive one or more beacon signals 202 each transmitted from a corresponding electronic device 201a, 201b, 201c, 201d when said beacon signal 202 is transmitted over the wireless network 101 or Internet 400.

Servers 410a, 410b, 410c and 410d are also connected to the Internet 400 and one or more of them may individually or together support electronic communications services available to end-users of electronic devices 201a, 201b, 201c and 201d, enabling them to send and receive electronic communications. Servers 410a, 410b, 410c and 410d may be web servers or communications servers, such as email servers.

Other servers and services may of course be provided allowing users of electronic devices 201a, 201b, 201c and 201d to send and receive electronic communications by, for example, Voice over IP phone calls, video IP calls, video chat, group video chat, blogs, file transfers, instant messaging, and feeds.

Wireless network 101 may also support electronic communications without using Internet 400. For example, a user of electronic device 201b may use wireless network 101 to make telephony calls, video calls, send text messages, send multimedia messages, and send instant messages to electronic device 201c.

The example shown in FIG. 5 is intended to be non-limiting and additional network infrastructure may of course be provided, such as a Public Switched Telephone Network (not shown), which may be used, for example, to make telephony calls using smartphone 201b to a wired phone (not shown).

To explain example modes of operation, reference is made below to FIGS. 6 to 8.

Figure 6:
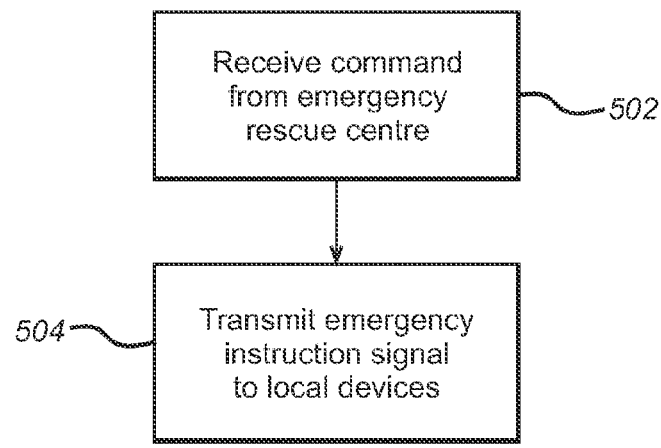
FIG. 6 is a flow diagram of a method of instructing an electronic device to transmit a beacon signal.

FIG. 6 shows a method performed by the base station 290. At block 502, the base station 290 receives a command from the Emergency Rescue Centre transmitter 501 to transmit or broadcast the beacon instruction signal to one or more of a plurality of electronic devices 201. The command received by each electronic device 201 from the Emergency Rescue Centre transmitter 501 comprises a special emergency code command which indicates that there is an emergency situation within a specified area or at a specific location, for example the location or area defined by the local cell or part thereof of the base station 290, or other area.

At block 504, the base station 290 transmits or broadcasts a signal via transmitter 292 to all electronic devices 201 connected to the wireless network 101 in communication with the base station 290. All of these electronic devices 201 which need to be placed into emergency beacon mode may be at the specific location or within the specified area, or only some of which may be within the specified area, and others may be in communication with similar base stations located at other locations. The signal transmitted by the base station 290 comprises a beacon mode instruction signal which can be received by each electronic device 201 which is currently in communication with the base station 290.

Following receipt of the beacon mode instruction signal by each electronic device 201, the control electronics 219 in each device 201 determines whether to place the device 201 into emergency beacon mode, for example by determining if the electronic device 201 is at or within a range of the specified area or location indicated by the base station 290. This can be done by comparing the specific location or area identified by the base station 290 with the location identified from the location determination means 269. Alternatively, each and every electronic device 201 that receives the beacon mode instruction signal from the base station is placed into emergency beacon mode, no matter what its specific location is.

If the device 201 determines that it should be placed into emergency beacon mode, it starts to transmit its beacon signal 202, and continues transmitting its beacon signal until instructed otherwise by user input of a further instruction signal received from the base station 290 or other device.

The base station 290 can be any suitable base station for transmitting or broadcasting signals over a wireless network 101 to electronic devices 201 within a specified geographic area, for example an area located within a broadcast range of the base station 290 up to 0.05, 0.1, 0.5, 1, 2, 3, 4, 5, 10, 20 or 30 kilometers. These ranges may define the cell size for cellular communications by the system. In some example embodiments of the invention, the base station 290 is a microcell wireless base station configured to broadcast the instruction signal to electronic devices in an area local to the base station 290, for example an area located within a broadcast range of the microcell base station up to 5, 10, 20, 30, 40, 50, 100 or 1000 meters.

It will be appreciated that the characteristics of the beacon mode instruction signal which is transmitted are dependent on the characteristics of the base station 290 and the wireless network 101. The beacon mode instruction signal may therefore comprise any signal suitable for transmission or broadcast to electronic devices 201 in a specified area. For example, the instruction signal may comprise a data packet, a frequency pulse, a paging message, or any other signal that can be received and detected by the electronic devices 201.

In some example embodiments of the invention, the base station 290 may be a Short Message Service (SMS) message centre. In this case, the beacon mode instruction signal comprises an SMS message, and this message may include an emergency beacon mode flag identifying the message as a beacon mode instruction signal, and possibly location data defining the specific area in which electronic devices must be located in order to be placed into emergency beacon mode.

In some example embodiments of the invention, the base station 290 is the server of an Internet Service Provider (ISP) and the instruction signal comprises a data packet transmitted across the Internet 400.

In further example embodiments of the invention, the base station 290 is a Cell Broadcast Center (CBC) and the beacon mode instruction signal is a cell broadcast message broadcast by the CBC to all electronic devices 201 connected to a cell corresponding to the CBC. The size of the cell corresponding to the CBC may vary according to the ranges specified above. The CBC may be connected to a Base Station Controller (BSC) in GSM networks or to a Radio Network Controller (RNC) in UMTS networks.

Figure 9:
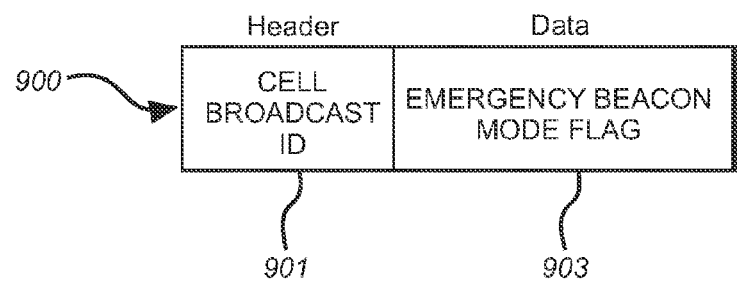
FIG. 9 is a representation of an example instruction signal transmitted by a base station.

An example of the beacon mode instruction signal 900 (first instruction signal), for example constituting a cell broadcast message, is shown in FIG. 9. The message may comprise a header field 901 in which a cell broadcast identification command, or other broadcast command may indicated, and instruction data 903 comprising further data, such as an emergency beacon mode flag, and possibly location or area data for indicating the location or area of the electronic devices which have to be placed into emergency beacon mode. When the beacon mode instruction signal 900 is received at the electronic device 201 and processed by control electronics 219, the control electronics 219 determines that beacon mode instruction signal 900 contains the emergency beacon mode flag.

Figure 7:
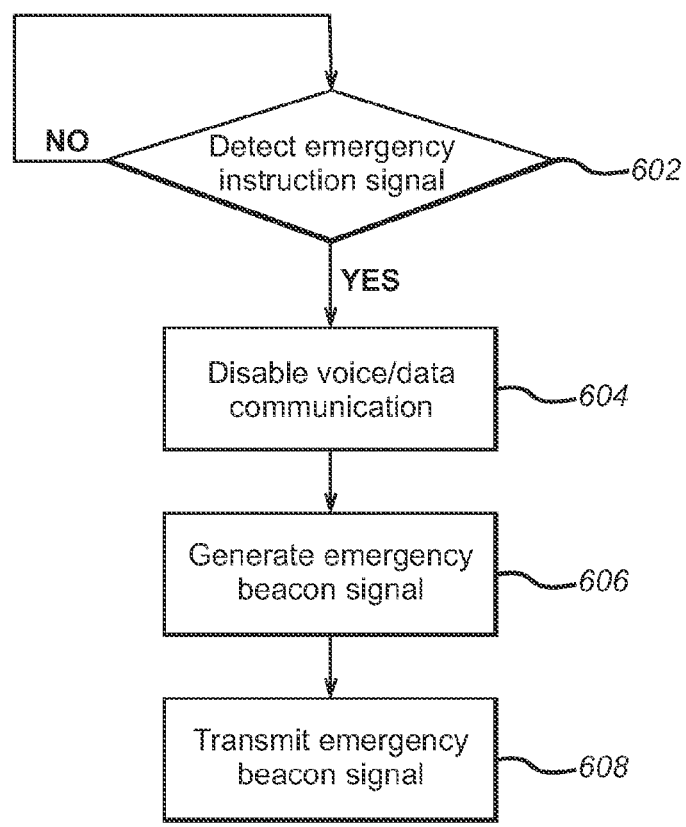
FIG. 7 is a flow diagram of a method of causing an electronic device to transmit a beacon signal.

FIG. 7 is a flow diagram of a method 600 which is performed by the control electronics 219 of the electronic device 201. Prior to execution of the method 600, the electronic device 201 operates in a first or 'regular' mode, such as a voice or data communication mode. In this first (or 'regular') mode the electronic device 201 operates a regular, normal or usual manner for the specific type of electronic device 201. This first mode may correspond to the data or voice communication modes described above. For example, components of the electronic device 201 may perform one or more of: transmitting or receiving voice or data communications via the wireless network 101; transmitting or receiving data via the internet 400 or using an NFC protocol; or running one or more software applications.

At block 602, the control electronics 219 polls the receiver 214 to determine whether the beacon mode instruction signal 900 has been received and identified from the base station 290. The control electronics 219 may continually attempt to detect whether that the received signal comprises the beacon mode instruction signal 900.

Figure 10A:
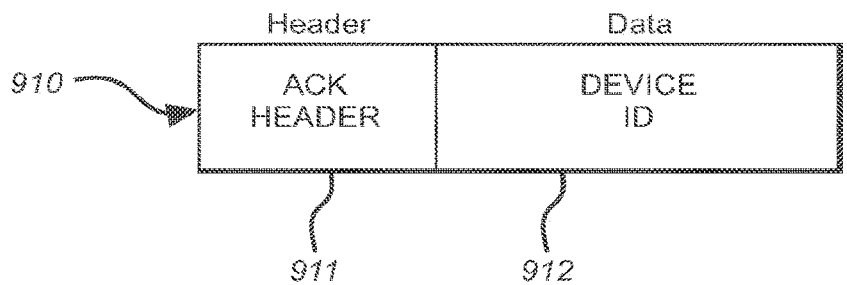
FIGS. 10(a)-10(b)(ii) are representations of example signals and their structure transmitted by one example electronic device.

In some example embodiments of the invention, responsive to the detection of the beacon mode instruction signal 900, the control electronics 219 causes one or other of the transmitter 213 and the second transmitter 213*b* to transmit an acknowledgement signal to the base station 290. An example acknowledgement signal 910 is shown in FIG. 10(*a*), in which the acknowledgement signal comprises an acknowledgement header 911 and data 912 indicating a device ID. This device ID may be unique to the electronic device 201 which has detected the beacon mode instruction signal 900.

At block 604, the electronic device 201, operating under the control of the control electronics 219, switches from the first normal mode to a second emergency beacon mode. In the emergency beacon mode, the receiver 212 ceases to receive and transmit communications of the voice and data modes. Instead, the receiver 214 is configured to receive only predetermined instruction signals, or no signals at all, and one or both of the transmitters 213 and 213*b* are configured to transmit only the beacon signals 202. In this manner, battery life of the electronic device 201 may be conserved so that the beacon signal 202 can be emitted for as long a duration as possible.

At block 606, the processor 240, operating under the control of the control electronics 219, generates the beacon signal 202. The beacon signal 202 may be any signal suitable for transmission through several layers of debris and suitable for use by the beacon receiver device 280 to determine a location or direction of the source of the signal.

In some example embodiments of the invention, the beacon signal 202 comprises a low power pulse signal. The low power ensures that battery power is conserved. However, the signal must have sufficient power to penetrate several meters of debris.

Figure 10B:
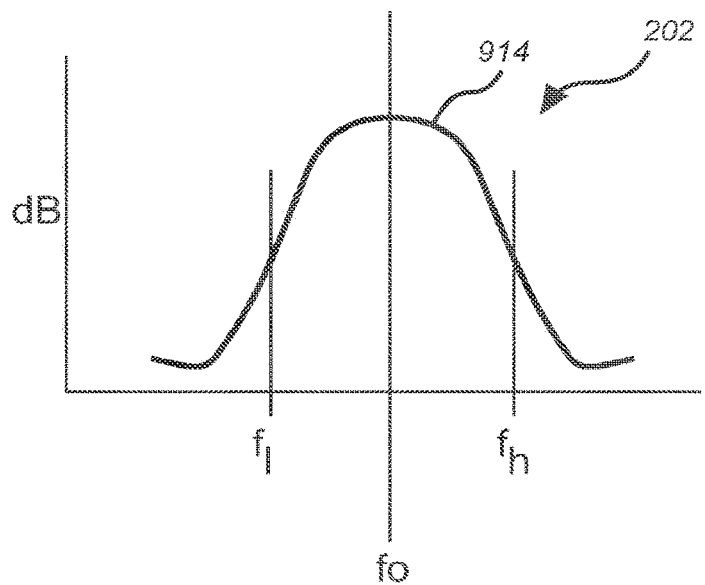
Figure 10B:
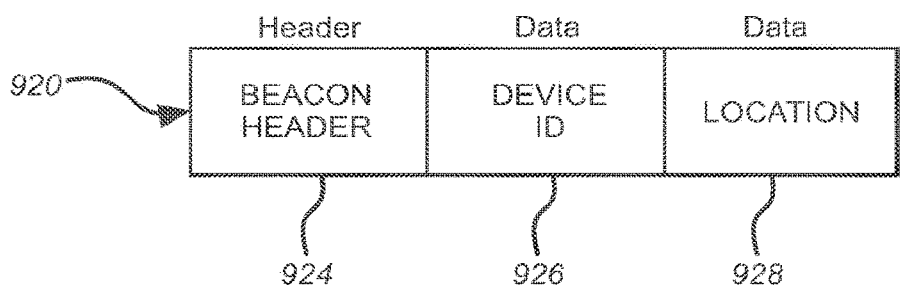

FIG. 10(b)(i) shows an example beacon signal 202 comprising a UWB frequency pulse 914. This pulse may be transmitted uni-directionally, multi-directionally or omnidirectionally by the transmitters 213, 213b and antennae 215, 215b. In further embodiments, the beacon signal 202 may comprise pulses of varying frequency (e.g. sweeping from a lower frequency to a higher frequency) which are transmitted. Information relating to the electronic device 201 or the location (or orientation) of the electronic device 201 may also be included in the beacon signal 202, for example by modulating the frequency pulse in accordance with the information to be included.

FIG. 10(b)(ii) shows the data structure of one example beacon signal 202 according to an embodiment of the invention. In this example, the beacon signal 202 comprises a data signal 920 including a beacon header 924 and one or both of data 926 indicating a unique device identification, and data 928 indicating the device location.

In some example embodiments of the invention, block 606 further comprises the location determination subsystem 269 determining the device location for inclusion in the beacon signal 202.

In some emergency situations, the location determination subsystem 269 may not be functional. For example, if the electronic device 201 is buried under several meters of debris and rubble, the location determination subsystem 269 may not be able to obtain information necessary to determine the device location since, for example, satellite or other radio frequency signals used to determine location are restricted or blocked entirely. In this case, the most recent location data that has been obtained by the location determination subsystem 269 and stored in one of the device memories (the RAM 246, the ROM 248 or the flash memory 244) is included and transmitted in the beacon signal 202.

In some embodiments, the data 928 may also include a timestamp associated with the location data.

In some example embodiments of the invention, the beacon signal 202 is transmitted by the transmitter 213 via antenna 215, which are the same transmitter and antenna as are used for transmitting voice and data signals when operating in voice communication mode and data communication mode respectively.

In alternative embodiments, the beacon signal is transmitted by the second transmitter 213b via one or other or antenna 215 or second antenna 215b. For example, it may be desirable to use an omnidirectional antenna for transmission of the beacon signal. Suitable antennae may include, for example: dipole antennae, multiple-input, multiple output (MIMO) antennae, or other tunable antennae.

In some example embodiments of the invention, in which the beacon signal comprises one or more data packets 910, the beacon signal may be transmitted via the internet 400.

In some example embodiments of the invention, the beacon signal is transmitted periodically whilst there is sufficient power in the battery 238.

In some example embodiments of the invention, transmission of the beacon signal 202 ceases in response to the control electronics 219 detecting that a second instruction signal has been received. The second instruction signal comprises any suitable signal that can be detected by the control electronics 219 when the electronic device 201 is operating in emergency mode. This provides the ability for the electronic device 201 to be switched back into normal (data or voice communication) mode For example, if the Emergency Rescue Centre transmitter 501 determines that a geographic area originally thought to have been experiencing an emergency situation is later determined to be outside the catastrophe zone, the Emergency Rescue Centre transmitter 501 can command the base station 290 to transmit a second instruction signal to electronic devices 201 in the geographic area. On detection of the second instruction signal, the control electronics 219 causes the electronic devices 201 to exit the emergency mode and, accordingly, to cease transmission of the beacon signal.

In an example embodiment, in which the base station 290 comprises a CBC, in response to a command from the Emergency Rescue Centre transmitter 501, the CBC transmits a second cell broadcast message instructing the electronic devices 201 to disable (or deactivate) emergency mode. In response to receiving this second cell broadcast message, the electronic device 201 exits emergency mode, ceases transmission of the beacon signal 202 and, if possible dependant on remaining battery power, returns to one or other of voice or data communication mode.

In an example embodiment of the invention, the second instruction signal can be input manually via the input interface 206. In this manner, electronic device users not requiring rescue can manually override the emergency mode, thereby preventing transmission of the beacon signal 202. In this manner, efforts of rescue teams can be focused on electronic device users requiring assistance.

In this embodiment, on detection of the beacon mode instruction (first) signal 900, the electronic device 201, operating under the control of the control electronics 219, alerts the user that the electronic device 201 is entering emergency beacon mode. For example, an audible alert may be emitted through the speaker 256 or the electronic device 201 may vibrate. In addition to the alert, the electronic device 201 may display instructions on the display 204 indicating how a user can respond to the alert to avoid the electronic device 201 entering emergency mode. In the absence of the required response to the alert, the electronic device 201 enters emergency beacon mode. Instructions regarding how the emergency mode can be disabled may be displayed on the display 204 whilst the electronic device is operating in emergency mode. Detection of the required user input at any stage whilst the electronic device 201 is operating in emergency mode causes the emergency mode to be disabled or deactivated.

Figure 8:
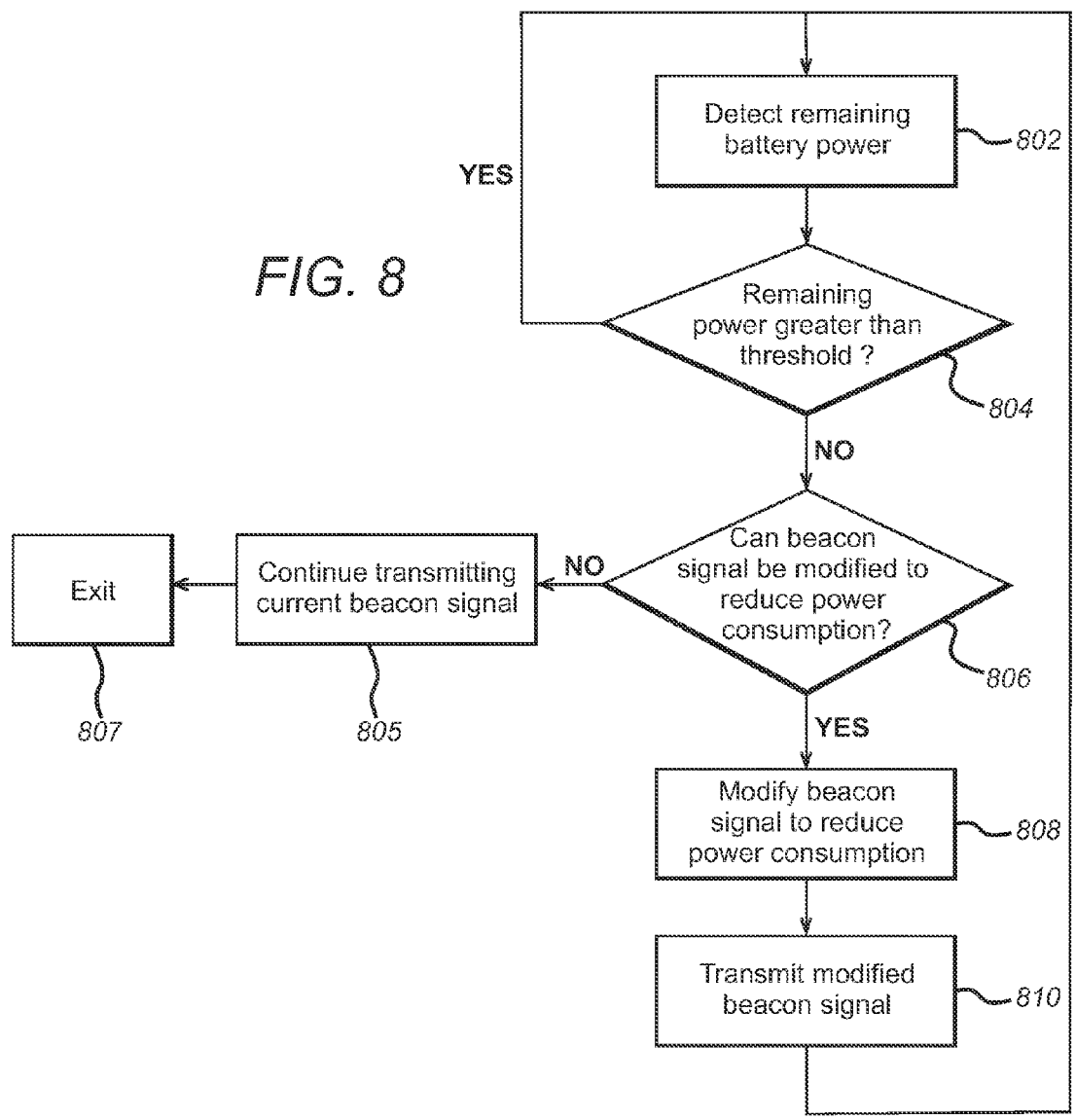
FIG. 8 is a flow diagram of a method of determining how to transmit a beacon signal based upon remaining battery power.

FIG. 8 is a flow diagram of a method of generating a beacon signal 202 in accordance with the remaining power in the battery 238.

At block 802, the processor 240 determines an indication of the remaining power (or charge) in the battery 238 via the battery interface 268. For example, the indication of the remaining battery power might be an indication of an expected time to failure of the battery, wherein failure of the battery occurs when the battery no longer contains sufficient power to transmit a beacon signal 202.

At block 804, the processor 240 compares the remaining battery power to a threshold power value stored in the ROM 248. If the remaining battery power (or the time to failure of the battery 238) is determined to be greater than the threshold value, the transmitter 213 (or the second transmitter 213b), operating under control of the control electronics 219, continues to transmit the beacon signal 202.

Alternatively, if the processor 240 determines that the remaining battery power (or the time to failure of the battery 238) is less than the threshold value at block 806 the processor 240 determines whether the beacon signal can be modified to reduce power consumption.

In embodiments where instructions regarding an input required to disable the emergency mode are displayed on the display 204 whilst the electronic device 201 is operating in the emergency mode the processor 240, operating under the control of the control electronics 219, ceases to display the instructions if the battery power is determined to be less than the threshold power at block 804.

If the processor 240 determines that the beacon signal 202 cannot be modified to reduce power consumption the transmitter 213 (or the transmitter 213b), operating under the control of the control electronics 219, transmits the beacon signal 202 without modification. In order to conserve power consumption if the output of block 806 is negative, method 800 then exits at block 807. In this manner, needless repetition of blocks 802 to 806 is avoided in order to avoid unnecessary consumption of battery power.

If, on the other hand, the processor 240 determines that the beacon signal 202 can be modified to reduce power consumption, at block 808 the processor 240, operating under the control of the control electronics 219, modifies characteristics of the beacon signal 202. For example, if the current beacon signal 202 being transmitted is a modulated frequency pulse, the processor 240 may modify the beacon signal by ceasing to modulate the pulse before transmission. In this manner, battery power that would otherwise be required to perform the modulation is no longer used.

Similarly, in a further example embodiment of the invention, at block 808, the beacon signal 202 comprises the data signal 920 and the processor 240, operating under the control of the control electronics 219, modifies the beacon signal to comprise a frequency pulse, e.g. the frequency pulse 914 of FIG. 10(b)(i). In this manner, battery power that would otherwise be required to generate and transmit the beacon signal data packets is no longer used. Alternatively, if the beacon signal 202 comprises the frequency pulse 914, the period at which the pulse is transmitted is decreased in order to conserve battery life.

The invention claimed is:

1. A portable communication device comprising:
a radio frequency signal transceiver configured to receive an instruction signal for causing transmission of a beacon signal; and
control electronics configured to:
detect that said instruction signal has been received;
in response to receiving said instruction signal, provide a prompt for user input; and
in response to not receiving user input to the prompt within a predetermined time interval, cause said portable communication device to:
disable voice and data communications; and
transmit said beacon signal while the voice and data communications are disabled, wherein said beacon signal is transmitted in a second frequency range different from a first frequency range associated with a mobile communications network, and said beacon signal includes a beacon header and a device identifier that identifies the portable communication device.

2. The portable communication device of claim 1, wherein the control electronics is further configured to switch the portable communication device between a first mode of operation and a second mode of operation, wherein in the second mode of operation, the control electronics controls the radio frequency signal transceiver to transmit the beacon signal.

3. The portable communication device of claim 2, wherein, in the first mode of operation, the control electronics controls the radio frequency signal transceiver to receive and transmit radio frequency signals within the first frequency range associated with a mobile communications network.

4. The portable communication device of claim 2, wherein in the second mode of operation, the control electronics is configured to control the radio frequency signal transceiver to transmit the beacon signal and deactivate the first mode of operation.

5. The portable communication device of claim 2, wherein when operating in the second mode of operation the radio frequency signal transceiver is configured to repeatedly transmit the beacon signal at predetermined time intervals.

6. The portable communication device of claim 2, wherein when operating in the second mode of operation the radio frequency signal transceiver is configured to repeatedly transmit the beacon signal via a plurality of predetermined frequencies of the second frequency range.

7. The portable communication device of claim 2, wherein the control electronics is configured to switch the portable communication device from the first mode of operation to the second mode of operation in response to receiving the instruction signal via the radio frequency transceiver from a remote location.

8. The portable communication device of claim 2, wherein the control electronics is further configured to provide a user input for receiving a user instruction to manually switch between the first mode of operation and the second mode of operation in response to the user instruction.

9. The portable communication device of claim 2, wherein the portable communication device is configured to switch from the first mode of operation to the second mode of operation in the absence of a response to the prompt for user input within a predetermined time interval.

10. The portable communication device of claim 2, wherein the instruction signal is a first instruction signal, and the portable communication device is configured to switch from the second mode of operation to the first mode of operation in response to a second instruction signal.

11. The portable communication device of claim 10, wherein the first instruction signal is received from a mobile communications network apparatus.

12. The portable communication device of claim 11, wherein the mobile communications network apparatus is one of:
a wireless base station;
a portable communications apparatus; or
a short message service (SMS) message centre.

13. The portable communication device of claim 10, wherein one or both of the first instruction signal and the second instruction signal is a cell broadcast signal which is broadcast to all portable communication devices, or a predefined sub-group of all portable communication devices currently in communication with the mobile communications network apparatus.

14. The portable communication device of claim 1, wherein the beacon signal comprises location data pertaining to the location of the portable communication device, the location data determined by the portable communication device.

15. The portable communication device of claim 1, wherein the beacon signal is a low power radio frequency signal, and wherein the control electronics is configured to cause a power level or modulation scheme of the beacon signal to be adapted in response to an amount of remaining battery power available to the portable communication device.

16. The portable communication device of claim 1, wherein the control electronics is configured to transmit an acknowledgement signal in response to detecting that the instruction signal has been received.

17. A method of controlling a portable communication device comprising control electronics, the method comprising:
   receiving an instruction signal;
   detecting that said instruction signal has been received;
   in response to receiving said instruction signal, causing said portable communication device with said control electronics to prompt for user input; and
   in the absence of a response to the prompt for user input within a predetermined time interval causing said portable communication device with said control electronics to:
      disable voice and data communications; and
      transmit a beacon signal responsive to said detecting of said instruction signal while the voice and data communications are disabled, wherein said beacon signal is transmitted in a second frequency range different from a first frequency range associated with a mobile communications network, and said beacon signal includes a beacon header and a device identifier that identifies the portable communication device.

18. The method of claim 17, further comprising:
   operating the portable communication device in a first mode in which a radio frequency transceiver of the portable communication device is configured to receive and transmit data within the first frequency range;
   wherein receiving the instruction signal comprises receiving the instruction signal when operating the portable communication device in the first mode.

19. The method of claim 18, further comprising:
   in response to the first instruction signal, switching the portable communication device to a second mode of operation,
   wherein in the second mode of operation the radio frequency transceiver operates under control of control electronics to transmit the beacon signal.

20. The method of claim 19, wherein, in the first mode of operation, the radio frequency transceiver operates under control of the control electronics to receive and transmit radio frequency signals within the first frequency range associated with a mobile communications network.

21. The method of claim 19, wherein in the second mode of operation, the radio frequency signal transceiver operates under control of the control electronics to cease to receive and transmit the radio frequency signals of the first mode of operation.

22. The method of claim 19, wherein when operating in the second mode of operation the radio frequency signal transceiver operates under control of the control electronics to repeatedly transmit the beacon signal at predetermined time intervals.

23. The method of claim 19, wherein when operating in the second mode of operation the radio frequency signal transceiver operates under the control of the control electronics to repeatedly transmit the beacon signal via a plurality of predetermined frequencies of the second frequency range.

24. The method of claim 19, wherein the control electronics switches the portable communication device from the first mode of operation to the second mode of operation in response to receiving a first instruction signal via the radio frequency transceiver from a remote location.

25. The method of claim 19, wherein the portable communication device switches from the first mode of operation to the second mode of operation in the absence of a response to the prompt for user input within a predetermined time interval.

26. The method of claim 19, wherein the instruction signal is a first instruction signal, wherein the portable communication device switches from the second mode of operation to the first mode of operation in response to a second instruction signal.

27. The method of claim 26, wherein one or both of the first instruction signal and the second instruction signal are received from a mobile communications network apparatus.

28. The method of claim 26, wherein one or both of the first instruction signal and the second instruction signal is a cell broadcast signal which is broadcast to all portable communication devices, or a predefined sub-group of all portable communication devices currently in communication with the mobile communications network apparatus.

29. The method of claim 17, wherein the beacon signal is a low power radio frequency signal, and wherein the control electronics causes a power level or modulation scheme of the beacon signal to be adapted in response to an amount of remaining battery power available to the portable communication device.

30. The method of claim 17, further comprising including identification information associated with the portable communication device in the beacon signal.

* * * * *